US008393390B2

(12) United States Patent
Gupta et al.

(10) Patent No.: US 8,393,390 B2
(45) Date of Patent: Mar. 12, 2013

(54) POLYMER HYDRATION METHOD

(75) Inventors: D. V. Satyanarayana Gupta, The Woodlands, TX (US); Harold L. Becker, Tomball, TX (US); James Michael Brown, Lago Vista, TX (US); Rupa Venugopal, Katy, TX (US)

(73) Assignee: Baker Hughes Incorporated, Houston, TX (US)

( * ) Notice: Subject to any disclaimer, the term of this patent is extended or adjusted under 35 U.S.C. 154(b) by 311 days.

(21) Appl. No.: 12/842,231

(22) Filed: Jul. 23, 2010

(65) Prior Publication Data

US 2012/0018159 A1 Jan. 26, 2012

(51) Int. Cl.
*E21B 43/04* (2006.01)
*E21B 43/25* (2006.01)
*E21B 43/26* (2006.01)
*C09K 8/68* (2006.01)
*C09K 8/86* (2006.01)
*C09K 8/90* (2006.01)

(52) U.S. Cl. ............ 166/278; 166/294; 166/305.1; 166/308.1; 166/308.2; 507/211; 507/217; 507/225; 507/904

(58) Field of Classification Search .............. None
See application file for complete search history.

(56) References Cited

U.S. PATENT DOCUMENTS

| 3,737,399 | A | * | 6/1973 | Locke et al. ............ 521/71 |
| 3,933,205 | A | | 1/1976 | Kiel |
| 3,965,982 | A | | 6/1976 | Medlin |
| 4,007,792 | A | | 2/1977 | Meister |
| 4,021,355 | A | | 5/1977 | Holtmyer et al. |
| 4,067,389 | A | | 1/1978 | Savins |
| 4,336,145 | A | * | 6/1982 | Briscoe ................ 507/211 |
| 4,378,845 | A | | 4/1983 | Medlin et al. |
| 4,479,041 | A | | 10/1984 | Fenwick et al. |
| 4,541,935 | A | | 9/1985 | Constien et al. |
| 4,549,608 | A | | 10/1985 | Stowe et al. |
| 4,623,021 | A | | 11/1986 | Stowe |
| 4,657,081 | A | | 4/1987 | Hodge |
| 4,660,643 | A | | 4/1987 | Perkins |
| 4,705,113 | A | | 11/1987 | Perkins |
| 4,714,115 | A | | 12/1987 | Uhri |
| 4,718,490 | A | | 1/1988 | Uhri |
| 4,724,905 | A | | 2/1988 | Uhri |
| 4,739,834 | A | | 4/1988 | Peiffer et al. |
| 4,779,680 | A | | 10/1988 | Sydansk |
| 4,817,717 | A | | 4/1989 | Jennings, Jr. et al. |
| 4,828,034 | A | * | 5/1989 | Constien et al. ......... 166/308.4 |
| 4,830,106 | A | | 5/1989 | Uhri |
| 4,846,277 | A | | 7/1989 | Khalil et al. |
| 4,848,468 | A | | 7/1989 | Hazlett et al. |
| 4,852,650 | A | | 8/1989 | Jennings et al. |
| 4,869,322 | A | | 9/1989 | Vogt, Jr. et al. |
| 4,892,147 | A | | 1/1990 | Jennings, Jr. et al. |
| 4,926,940 | A | | 5/1990 | Stromswold |
| 4,938,286 | A | | 7/1990 | Jennings, Jr. |
| 4,969,523 | A | | 11/1990 | Martin et al. |
| 5,005,645 | A | | 4/1991 | Jennings, Jr. et al. |
| 5,024,276 | A | | 6/1991 | Borchardt |
| 5,052,486 | A | * | 10/1991 | Wilson ................ 166/308.4 |
| 5,074,359 | A | | 12/1991 | Schmidt |
| 5,228,510 | A | | 7/1993 | Jennings, Jr. et al. |
| 5,363,919 | A | | 11/1994 | Jennings, Jr. |
| 5,402,846 | A | | 4/1995 | Jennings, Jr. et al. |
| 5,411,091 | A | | 5/1995 | Jennings, Jr. |
| 5,472,049 | A | | 12/1995 | Chaffee et al. |
| 5,488,083 | A | | 1/1996 | Kinsey, III et al. |
| 5,492,178 | A | | 2/1996 | Nguyen et al. |
| 5,497,831 | A | | 3/1996 | Hainey et al. |
| 5,551,516 | A | | 9/1996 | Norman et al. |
| 5,562,160 | A | | 10/1996 | Brannon et al. |
| 5,711,396 | A | | 1/1998 | Joerg et al. |
| 5,722,490 | A | | 3/1998 | Ebinger |
| 5,755,286 | A | | 5/1998 | Ebinger |
| 5,827,804 | A | | 10/1998 | Harris et al. |
| 6,016,871 | A | | 1/2000 | Burts, Jr. |
| 6,123,394 | A | | 9/2000 | Jeffrey |
| 6,135,205 | A | | 10/2000 | Phillips |
| 6,169,058 | B1 | | 1/2001 | Le et al. |
| 2008/0171828 | A1 | * | 7/2008 | Bening et al. ........... 524/577 |
| 2008/0317615 | A1 | * | 12/2008 | Banister ................ 417/413.1 |
| 2009/0023614 | A1 | * | 1/2009 | Sullivan et al. .......... 507/214 |
| 2009/0095472 | A1 | | 4/2009 | Andersson et al. |
| 2010/0160188 | A1 | | 6/2010 | Chen |

FOREIGN PATENT DOCUMENTS

EP 0845291 A1 6/1998
WO WO 2009143061 A2 11/2009

OTHER PUBLICATIONS

Becker, JR, et al., "Quantum Effects Imparted by Radio Frequencies as a Stimulation Method of Oil Production", SPE International, 2009 SPE Annual Technical Conference and Exhibition Oct. 4-7, 2009 (6 pages).
Brookfield Engineering Company Website; TT-100 In-Line Viscometer; website: http://www.brookfieldengineering.com/products/visometers/process-tt-100.asp; Copyright 2005 (2 pages).
Gupta, D. V. S., et al., "A New Concept for On-the-Fly Hydration of Water-based Fracturing Fluids", SPE International, 1998 SPE Gas Technology Symposium Mar. 15-18, 1998 (3 pages).

*Primary Examiner* — George Suchfield
(74) *Attorney, Agent, or Firm* — McGlinchey Stafford PLLC; R. Andrew Patty, II

(57) ABSTRACT

Disclosed is a method of rapidly hydrating a hydratable polymer, which method involves irradiating with radio frequency electromagnetic radiation, a mixture of at least the polymer and an aqueous hydrotreating medium to form a viscosified mixture of at least aqueous hydrotreating medium and hydrated polymer. Related methods of treating a subterranean formation and continuously hydrotreating a subterranean formation are also revealed.

20 Claims, 2 Drawing Sheets

POLYMER HYDRATION METHOD

TECHNICAL FIELD

The present invention pertains to methods of hydrating polymers, and to the application of such methods for use in treatment of subterranean well formations.

BACKGROUND

Water-soluble polymers are frequently used as components in well treatment fluids. Such fluids have useful physical and chemical properties making them particularly useful, for example, in hydraulic fracturing and/or gravel packing of subterranean well formations. Due to the volumes of fluid employed in these or similar operations, and the residence times and/or shear conventionally required to hydrate such polymers in commercial and so-called "on-the-fly" applications, it often has been necessary in commercial practice to undertake hydration using large vats or tanks and other sophisticated shearing equipment at significant operational cost. While it has been known to be desirable to increase the rate of polymer hydration for such purposes, few practical and economical solutions have been developed for use in commercial and industrial applications, including well treatment operations.

SUMMARY OF THE INVENTION

The present invention provides a uniquely addresses the need for efficient polymer hydration processes by enabling rapid hydration of mixtures or feeds comprising at least an aqueous hydrotreating medium and a hydratable polymer, using relatively modest resources when compared to previously known systems. In fact, at least some aspects of the invention enable the reduction in size, or in some cases the complete elimination, of conventional polymer hydration units used in, for example, oil and gas well operations.

In one aspect of the invention, there is provided a method of rapidly hydrating a hydratable polymer. The method comprises irradiating with radio frequency electromagnetic radiation, a mixture of at least the hydratable polymer and an aqueous hydrotreating medium to form a viscosified mixture comprising aqueous hydrotreating medium and hydrated polymer.

Another aspect of this invention provides a method of treating a subterranean formation, which method comprises injecting into the formation a viscosified mixture formed in accordance with this invention.

Also provided in one aspect of the invention is a well treatment fluid comprising a hydrated polymer formed by a method in accordance with the invention.

In yet another of its aspects, the invention provides a continuous process of hydrotreating a subterranean formation. This particular method comprises:

continuously flowing through an irradiation zone of radio frequency electromagnetic radiation a mixture of at least a hydratable polymer and an aqueous hydrotreating medium to continuously convert the mixture into a viscosified mixture comprising the aqueous hydrotreating medium and hydrated polymer; and injecting a fluid comprising the viscosified mixture into the subterranean formation.

These and other aspects, features and advantages of the invention shall become even further apparent from the following detailed description, appended figures and accompanying claims.

FURTHER DETAILED DESCRIPTION OF THE INVENTION

Figure 1:
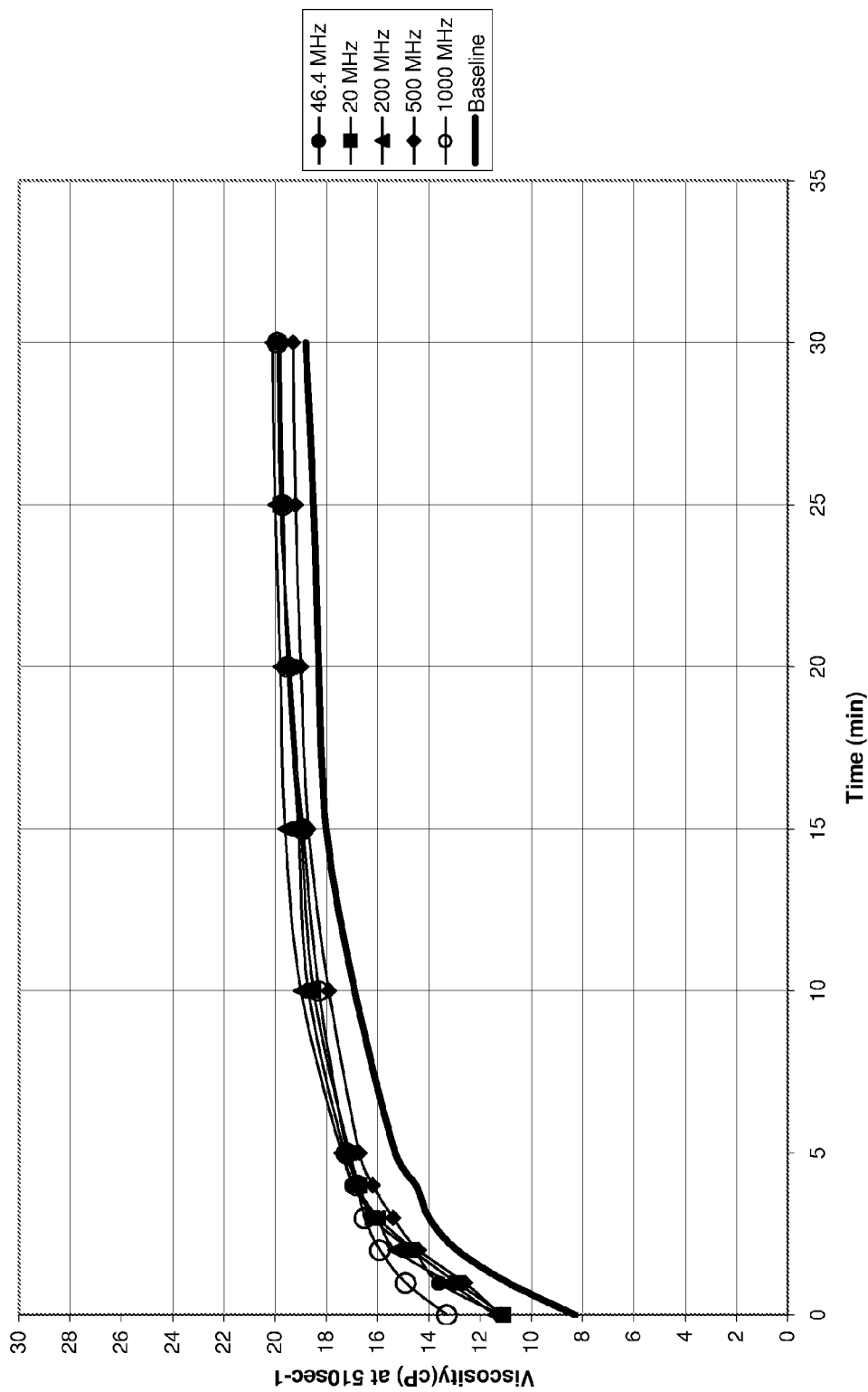
FIG. 1 is graph of the data presented in Table 1 from the Example set out below.

As can now be appreciated, the present invention employs electromagnetic wave irradiation to accelerate hydration of hydratable polymers, to form hydrated polymers which can be deployed rapidly for use. In at least some aspects of the invention, process efficiencies are realized because users can more readily control the amount of hydrated polymer formed, so that only the amount of hydratable polymer needed for a given application is actually hydrated for use and waste or the need for long-term storage of large quantities of hydrated polymer is avoided.

The irradiation is added radio frequency electromagnetic radiation, added in the sense that it is supplied from a source separate from and in addition to radiation sources naturally existing in the ambient environment. The particular radio frequency electromagnetic radiation source employed can be any source of added electromagnetic wave energy, but is preferably a radio frequency transmitter equipped to direct a signal with sufficient frequency and power to effect hydration of the polymer material in the mixture in an irradiation zone. The irradiation may be accomplished conveniently through, e.g., the use of a radio frequency (RF) generator component and an RF power amplifier component configured to generate frequencies using low levels of power (1000 Watts or less) and transmit such signals toward a defined area using an antenna or similar device which is directly adjacent, or in relatively close proximity (i.e., within several meters or less), to the irradiation zone. An example of such equipment is that taught in PCT Application Publication No. WO 2009/143061 A2, the disclosure of which is incorporated herein by reference. The electromagnetic radiation is in the radio frequency range (i.e., about 30 kHz to about 300 GHz), and is preferably in the range of about 500 Hz to about 1400 MHz, and even more preferably in the range of about 1 Mhz to about 1000 MHz. The radiation signal amplification employed may vary widely, but can be low, i.e., in the range of about 1 to about 1000 Watts. The amount of time a given volume of hydratable polymer-containing mixture is exposed to such radiation may vary also, but is preferably a residence time in the range of about 1 second to about 60 seconds, and more preferably in the range of about 5 seconds to about 60 seconds.

The hydratable polymers useful in the practice of the invention include natural or synthetic polymers, or a combination thereof. Non-limiting examples of suitable natural polymers include guar, guar derivatives, and the like. Non-limiting examples of suitable guar include carboxyalkyl guar or a hydroxyalkylated guar, such as carboxymethyl guar (CMG), hydroxypropyl guar (HPG), hydroxyethyl guar (HEG), hydroxybutyl guar (HBG) and carboxymethylhydroxypropyl guar (CMHPG). It is sometimes preferred that the hydroxyalkylated guar has a molecular weight of about 1 to about 3 million. The carboxyl content of the hydratable polysaccharides is expressed as Degree of Substitution (DS), and DS of the carboxylated guar is typically in the range of about 0.08 to about 0.18. The hydroxypropyl content of the hydroxyalkylated guar, expressed as Molar Substitution (defined as the number of moles of hydroxyalkyl groups per mole of anhydroglucose), is typically in the range of about 0.25 to about 0.6. Further preferred as the polymer in certain aspects of the invention are those polymers available from BJ Services Company as GW-3 (guar), GW-4 (guar), GW-2 (guar), "GW45" (CMG), "GW32" (HPG) and "GW38" (CMHPG). Slurried counterparts of these polymers may also be used and are available from BJ Services Company as "GLFC-5" (GW-3 slurry), "GLFC2" (HPG), "GLFC2B" (HPG), "GLFC3" (CMPHG), "GLFC3B" (CMHPG), "XLFC2" (HPG), "XLFC2B" (HPG), "XLFC3" (CMPHG), "XLFC3B" (CMHPG), "VSP1" (CMG), and "VSP2" (CMG). Non-limiting examples of suitable synthetic polymers include acrylamide polymers, vinyl sulfonates, and the like. An acrylamide polymer maybe a polymer or copolymer of acrylamide useful as, e.g., a friction reducing agent for slickwater fracturing treatments. Even though these acrylamide polymers are often called "polyacrylamide", many are actually copolymers of acrylamide and one or more other chemical species. The main consequence is to give the "modified" polyacrylamide some ionic character. The polyacrylamide may also be used as a homopolymer. As used herein, the expression "polyacrylamide" is meant to encompass acrylamide homopolymers and copolymers, or any suitable synthetic form of polyacrylamide. As used herein, "homopolymers" are those polymers containing less than about 0.1% by weight of other comonomers. Combinations or mixtures of homopolymers and copolymers may be used as well. The copolymers may include two or more different comonomers and may be random or block copolymers. The comonomers may include, for example, sodium acrylate. The polyacrylamide polymers and copolymers useful for the invention may include those having an average molecular weight of from about 1000, or lower, to about 20 million, or above, with from about 1 million to about 5 million being typical. Other suitable friction reducers may be used as well; for example vinyl sulfonates (e.g. polyAMPS). Any combination of one or more natural and/or synthetic polymers may also be used as the hydratable polymer component. Typically, the amount of hydratable polymer employed can vary widely, but can be preferably in the range of about 15 to about 50, or about 20 to about 30, pounds per 1,000 gallons of aqueous hydrotreating medium (e.g., water) in the fluid. In at least some aspects of the invention, the amount of aqueous hydrotreating medium is preferably minimized to employ the least amount possible while still achieving the desired level of polymer hydration.

The aqueous hydrotreating medium used in the practice of the invention is comprised of water or one or more hydrating compositions, or a combination thereof. Besides water, suitable hydrating compositions may include, for example, fresh water, brine, produced water, or the like, as well as any combination of two or more of the foregoing.

The mixture formed from at least the hydratable polymer(s) and the aqueous hydrotreating medium may optionally further include other additives commonly used in combination with hydrated polymer compositions, depending upon the intended use of the mixture. Some examples of other suitable additives which may be employed include foaming agents, cross-linking agents, oxidizing agents, radical initiators, proppants, surfactants, emulsifiers, stabilization additives, buffering agents, complexing agents, gel breakers, biocides, surface tension reducing agents, scale inhibitors, gas hydrate inhibitors, polymer specific enzyme breakers, clay stabilizers, acid or a mixture thereof and other well treatment additives known in the art.

A mixture comprised of at least the hydratable polymer and the aqueous hydrotreating medium is formed by any conventional manner, such as by batch, semi-batch, continuous or semi-continuous processes. In a batch process, the mixture is formed by placing the mixture components into a tank or other vessel, using any sequence of addition or concurrent addition, and supplying agitation to the batch mixture sufficient to at least cause the components to substantially come into contact with one another sufficiently so that hydration may occur. In a continuous process, at least some of the components of the mixture are feed together by injection or any other means into a feed conduit defining a mixing zone so as to form a flowable stream or feed of the mixture. The pressure and temperature conditions employed in the mixing zone and associated conduit equipment may vary widely, and may be elevated, ambient or reduced temperatures and pressures, within the limits of the pressures and temperatures necessary to form and use the hydrated polymer-containing mixture for the application(s) desired.

The mixture so formed may be exposed to radio frequency electromagnetic radiation at an irradiation zone of at least one feed conduit integral with the conduit forming the mixing zone or in fluid communication with the conduit(s) defining the mixing zone, or the formed mixture may be fed to one or more intermediate holding tanks or vessels which may serve as the irradiation zone. In the irradiation zone, the mixture is exposed to radio frequency electromagnetic wave energy emitted by an antenna or like source of radio frequency electromagnetic wave energy generated by an RF transmitter/amplifier electronically coupled thereto. As noted previously, the residence time during which the mixture is irradiated can vary, but is preferably no more than one (1) minute, and is more preferably is in the range of about 1 to about 60 seconds, or in the range of about 5 to about 60 seconds.

Upon irradiation, the mixture of at least the hydratable polymer and the aqueous hydrotreating medium becomes viscosified as the polymer hydrates, thereby forming a viscosified mixture comprising at least the aqueous hydrotreating medium and the hydrated polymer.

Another type of well servicing fluid in which hydrated polymer produced in accordance with this invention is useful is gravel packing fluid. Gravel packing fluid has relatively large grained sand, e.g., gravel, suspended therein that may be utilized to prevent migration of smaller grained sand from the subterranean formation into the well bore and to maintain the integrity of the formation. In gravel packing operations, a permeable screen may be placed against the face of the subterranean formation, followed by pumping the gravel packing fluid into the annulus of the well bore such that gravel becomes packed against the exterior of the screen.

Gravel packing fluids are often aqueous based fluids. The aqueous base is known to include either freshwater, produced water or brines. Gravel packing fluids generally include a viscosifier that can provide appropriate viscosity to allow effective suspension and/or transport of the gravel.

In gravel packing and hydraulic frac packing, a particulate-laden slurry typically is pumped into the well bore through a tubing. The slurry is communicated from the interior of the tubing to an annulus between sand control screens of the production string and the wall of the well bore (open or cased) via a cross-over tool. The particulate in the slurry is deposited in the annulus about the sand screens to pack the annulus. In frac packing, the particulate is placed in connection with a fracing operation. In gravel packing, the zone about the well bore may or may not have been fraced, but the particulate normally is placed in a separate operation.

The hydrated polymer compositions hydrated in accordance with this invention may be useful in any conventional gravel packing or hydrolytic fracturing method employing a hydrated polymer or a composition comprising a hydrated polymer. The following U.S. patents disclose examples of various techniques for conducting hydraulic fracturing, and their teachings are incorporated herein by reference: U.S. Pat. Nos. 6,169,058; 6,135,205; 6,123,394; 6,016,871; 5,755,286; 5,722,490; 5,711,396; 5,551,516; 5,497,831; 5,488,083; 5,482,116; 5,472,049; 5,411,091; 5,402,846; 5,392,195; 5,363,919; 5,228,510; 5,074,359; 5,024,276; 5,005,645; 4,938,286; 4,926,940; 4,892,147; 4,869,322; 4,852,650; 4,848,468; 4,846,277; 4,830,106; 4,817,717; 4,779,680; 4,479,041; 4,739,834; 4,724,905; 4,718,490; 4,714,115; 4,705,113; 4,660,643; 4,657,081; 4,623,021; 4,549,608; 4,541,935; 4,378,845; 4,067,389; 4,007,792; 3,965,982; and 3,933,205. Examples of methods of gravel packing are further disclosed at least in U.S. Pat. No. 4,969,523 and U.S. Pat. No. 5,492,178, the teachings of which are incorporated herein by reference.

One example of the present invention will now be experimentally illustrated. This illustration should not be construed as limiting or defining the scope of the invention.

Example 1

Linear gel samples were prepared by adding GLFC-5 slurry (a high yield guar GW-3 slurried in mineral oil) available from BJ Services Company of Houston, Tex., to water. The following procedure was used to evaluate the effect of exposure of each sample mixture to radio frequency on the hydration. The fluid was irradiated by radio frequency waves for 10 seconds and viscosity of the treated fluid was measured using an OFITE M900 viscometer available from OFI Testing Equipment, Inc. of Houston, Tex.

Test Procedure

For each sample, the constant speed mixer was set at 1500 rpm for 1 minute mixing. 250 ml of tap water was measured into the blender jar. 1.56 ml of GLFC-5 slurry was measured and added to the vortex in order to yield 25 ppt (pounds per thousand gallons) fluid and mixed for 1 minute. The sample mixture was quickly (i.e., within seconds) transferred into a stainless steel collection flask containing a helical 10 foot, 6 inch antenna of ½ wavelength of the frequency of RF, which antenna was coupled to an ANRITSU frequency generator, a broad band amplifier, VSWR matching box, and a power meter. The metal top was then placed on the flask and the mixture was irradiated with radio frequency waves at one of the different specified frequencies from 20 to 1000 Mz for 10 seconds. The treated mixture was then quickly poured back into the viscometer cup and the timer started. The temperature of the treated fluid was noted and as quickly as possible the first viscosity measurement was carried out at 300 rpm on an OFITE M900 viscometer using R1B1 Rotor bob configuration at a shear rate of 510 sec$^{-1}$. The measurement was repeated every minute up to 5 minutes and then repeated every 5 minutes up to 30 minutes. The resulting data generated for the different samples, one being untreated and the others being treated at the indicated frequencies, is set out in Table 1 below, and plotted on the accompanying FIG. 1.

TABLE 1

| Time (min) | Viscosity (cP) | | | | | |
|---|---|---|---|---|---|---|
| | 46.4 MHz | 20 MHz | 200 MHz | 500 MHz | 1000 MHz | Baseline |
| 0 | 11.2 | 11.1 | 11.4 | 11.2 | 13.3 | 8.3 |
| 1 | 13.6 | 12.9 | 13.2 | 12.6 | 14.9 | 10.9 |
| 2 | 14.6 | 14.7 | 15.3 | 14.4 | 15.9 | 12.9 |
| 3 | 16 | 16.2 | 16 | 15.4 | 16.5 | 14 |
| 4 | 17 | 16.7 | 16.9 | 16.2 | 16.8 | 14.5 |
| 5 | 17.3 | 17.1 | 17.4 | 16.7 | 17.2 | 15.3 |
| 10 | 18.7 | 18.5 | 19 | 17.9 | 18.3 | 16.9 |
| 15 | 19.1 | 19 | 19.6 | 18.7 | 18.9 | 18 |
| 20 | 19.5 | 19.4 | 19.8 | 19.0 | 19.5 | 18.3 |
| 25 | 19.7 | 19.8 | 20 | 19.2 | 19.7 | 18.5 |
| 30 | 19.8 | 19.9 | 20.1 | 19.3 | 19.9 | 18.8 |

Figure 2:
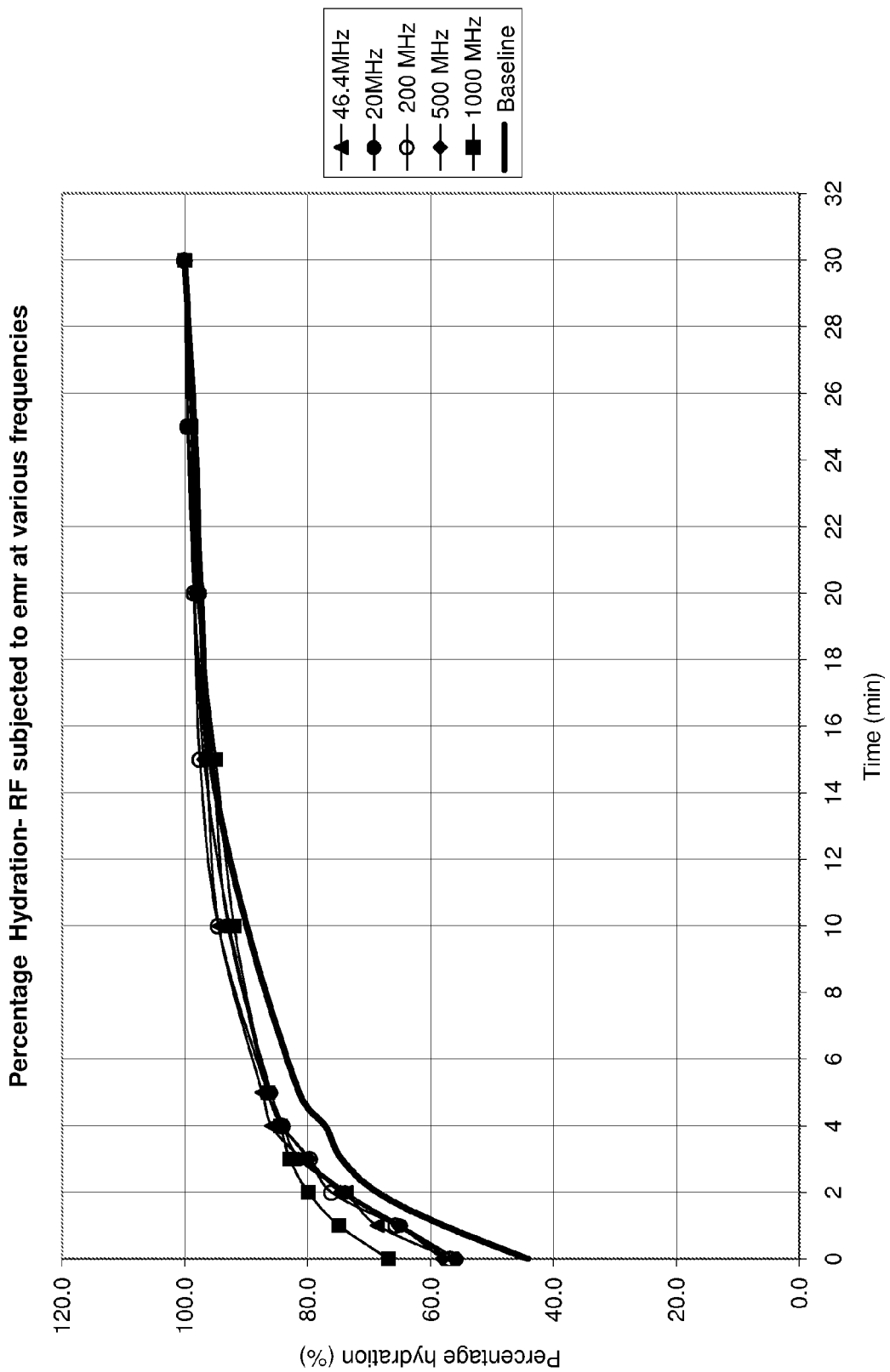
FIG. 2 is a graph of the data presented in Tables 2-7 from the Example set out below.

The hydration percentage was also calculated at different time periods for mixtures so formed and exposed to different frequencies of radio frequency electromagnetic radiation. Hydration percentages were determined by use of the following formula % hydration=(viscosity in cP/ultimate viscosity in cP)×100, where "ultimate viscosity" is the viscosity in centipoise determined at the termination of the period of time necessary for complete hydration (in this case 30 minutes). The results of such hydration percentage determinations at various times for frequencies of 20, 46.4, 200, 500 and 1000 MHz and at baseline (no added irradiation) are set forth below in Tables 2 through 7, respectively. These results are also plotted on the accompanying FIG. 2.

TABLE 2

20 Mhz

| Time (min) | Viscosity (cP) | % hydration |
|---|---|---|
| 0 | 11.10 | 55.78 |
| 1 | 12.90 | 64.82 |
| 2 | 14.70 | 73.9 |
| 3 | 16.20 | 81.4 |
| 4 | 16.70 | 83.9 |
| 5 | 17.10 | 85.9 |
| 10 | 18.50 | 93.0 |
| 15 | 19.00 | 95.5 |
| 20 | 19.40 | 97.5 |
| 25 | 19.80 | 99.5 |
| 30 | 19.90 | 100.0 |

TABLE 3

46.4 MHz

| Time (min) | Viscosity (cP) | % hydration |
|---|---|---|
| 0 | 11.2 | 56.6 |
| 1 | 13.6 | 68.7 |
| 2 | 14.6 | 73.7 |
| 3 | 16 | 80.8 |
| 4 | 17 | 85.9 |
| 5 | 17.3 | 87.4 |
| 10 | 18.7 | 94.4 |
| 15 | 19.1 | 96.5 |
| 20 | 19.5 | 98.5 |
| 25 | 19.7 | 99.5 |
| 30 | 19.8 | 100.0 |

TABLE 4

200 Mhz

| Time (min) | Viscosity (cP) | % hydration |
|---|---|---|
| 0 | 11.4 | 56.72 |
| 1 | 13.2 | 65.67 |
| 2 | 15.3 | 76.1 |

TABLE 4-continued

200 Mhz

| Time (min) | Viscosity (cP) | % hydration |
|---|---|---|
| 3 | 16 | 79.6 |
| 4 | 16.9 | 84.1 |
| 5 | 17.4 | 86.6 |
| 10 | 19 | 94.5 |
| 15 | 19.6 | 97.5 |
| 20 | 19.8 | 98.5 |
| 25 | 20 | 99.5 |
| 30 | 20.1 | 100.0 |

TABLE 5

500 Mhz

| Time (min) | Viscosity (cP) | % hydration |
|---|---|---|
| 0 | 11.2 | 58.03 |
| 1 | 12.6 | 65.28 |
| 2 | 14.4 | 74.6 |
| 3 | 15.4 | 79.8 |
| 4 | 16.2 | 83.9 |
| 5 | 16.7 | 86.5 |
| 10 | 17.9 | 92.7 |
| 15 | 18.7 | 96.9 |
| 20 | 19.0 | 98.4 |
| 25 | 19.2 | 99.5 |
| 30 | 19.3 | 100.0 |

TABLE 6

1000 Mhz

| Time (min) | Viscosity (cP) | % hydration |
|---|---|---|
| 0 | 13.3 | 66.83 |
| 1 | 14.9 | 74.87 |
| 2 | 15.9 | 79.9 |
| 3 | 16.5 | 82.9 |
| 4 | 16.8 | 84.4 |
| 5 | 17.2 | 86.4 |
| 10 | 18.3 | 92.0 |
| 15 | 18.9 | 95.0 |
| 20 | 19.5 | 98.0 |
| 25 | 19.7 | 99.0 |
| 30 | 19.9 | 100.0 |

TABLE 7

Baseline

| Time (min) | Viscosity (cP) | % hydration |
|---|---|---|
| 0 | 8.3 | 44.15 |
| 1 | 10.9 | 57.98 |
| 2 | 12.9 | 68.6 |
| 3 | 14 | 74.5 |
| 4 | 14.5 | 77.1 |
| 5 | 15.3 | 81.4 |
| 10 | 16.9 | 89.9 |
| 15 | 18 | 95.7 |
| 20 | 18.3 | 97.3 |
| 25 | 18.5 | 98.4 |
| 30 | 18.8 | 100.0 |

As seen from the experimental illustration, significant increases in the rate of hydration can be achieved when the mixture is exposed to added electromagnetic wave energy. The amount of such energy required is relatively low, as the signals employed to generate this improvement were no more than 1000 watts. Having the benefit of this disclosure, it is now possible for systems employed to be further adapted and configured with one or more in-line sensors and automated radio frequency electromagnetic radiation transmission controls to provide feedback loop-enabled adjustments, so that the frequency and power employed in transmission of the wave energy to the irradiation zone can be adjusted automatically, to optimize hydration for a given mixture composition and application. In another aspect of the invention, therefore, the process may further comprise automatically controlling the radio frequency electromagnetic radiation in the irradiation zone using a feedback signal indicative of a periodically or continuously measured viscosity of the viscosified mixture. Fluid pumping systems may thus be configured with, for example, a sensor such as an in-line viscometer to measure feed or mixture viscosity periodically or continuously and to provide one or more signals indicative of viscosity of the mixture or feed in essentially real-time, with such signals fed back to the electromagnetic transmission equipment controls electronically coupled to the radio frequency transmitter and/or amplifier, so that the controls may adjust the power and/or frequency of irradiation supplied to the irradiation zone. In this way, the system may be configured to enable automatic adjustment of the downstream viscosity to within a desired level or range. One example of a suitable in-line viscometer would be a TT-100 in-line viscometer available from Brookfield Engineering Laboratories, Inc. of Middleboro, Mass. In this way, the present invention enables a fully automated system for rapidly hydrating a hydratable polymer composition and controlling the viscosity of a continuous feed of such composition into either an intermediate tank (e.g., for a plug injection) or into the well bore.

The hydrated polymer compositions of this invention have been described as having utility in well formation fracturing fluids and gravel packing fluids, but it is also contemplated that such hydrated polymer compositions and methods of their formation could have other utility in any other fluids which call for the presence of one or more hydrated polymers, such as, for example, completion fluids, fluid loss pills, diverter fluids, foamed fluids, stimulation fluids and the like.

Examples of aspects of the present invention thus include, without limitation, at least:

A. A method of rapidly hydrating a hydratable polymer, which method comprises irradiating with radio frequency electromagnetic radiation, a mixture of at least the polymer and an aqueous hydrotreating medium to form a viscosified mixture comprising aqueous hydrotreating medium and hydrated polymer.

B. A method as in A wherein the electromagnetic radiation is of a frequency in the range of about 500 KHz to about 1400 MHz.

C. A method as in B wherein the electromagnetic radiation is of a frequency in the range of about 1 to about 1000 MHz.

D. A method as in D, wherein the electromagnetic radiation signal is in the range of about 30 to about 1000 watts.

E. A method as in any of A-D wherein the irradiation is conducted for a period of time in the range of about 5 to about 60 seconds.

F. A method of treating a subterranean formation, which method comprises injecting into the formation a viscosified mixture formed as in any of the preceding A-E.

G. A method as in F wherein the method is utilized in connection with hydrolytically fracturing a subterranean well formation.

H. A method as in F wherein the method is utilized in connection with gravel packing a subterranean well formation.

I. A continuous process of hydrotreating a subterranean formation, which method comprises:
continuously flowing through an irradiation zone of radio frequency electromagnetic radiation a mixture of at least a hydratable polymer and an aqueous hydrotreating medium to continuously convert the mixture into a viscosified mixture comprising the aqueous hydrotreating medium and hydrated polymer; and
injecting a fluid comprising the viscosified mixture into the subterranean formation.

J. A process as in I wherein the electromagnetic radiation is of a frequency in the range of about 500 KHz to about 1400 MHz with a signal of about 30 to about 1,000 watts, and wherein the mixture of at least the hydratable polymer and the aqueous hydrotreating medium has a rate of flow through the zone that provides an average residence time of the continuously flowing mixture in the zone within the range of about 5 to about 60 seconds.

K. A method as in any of I and J, further comprising automatically controlling the radio frequency electromagnetic radiation in the irradiation zone using a feedback signal indicative of a periodically or continuously measured viscosity of the viscosified mixture.

L. A method as in any of I-K wherein the method is utilized in connection with hydrolytically fracturing a subterranean well formation.

M. A method as in any of Claims I-K wherein the method is utilized in connection with gravel packing a subterranean well formation.

N. A well treatment fluid comprising a hydrated polymer formed by a method as in any of A-E.

Components referred to by chemical name or formula anywhere in the specification or claims hereof, whether referred to in the singular or plural, are identified as they exist prior to coming into contact with another substance referred to by chemical name or chemical type (e.g., another component, a solvent, or etc.). It matters not what chemical changes, transformations and/or reactions, if any, take place in the resulting mixture or solution as such changes, transformations, and/or reactions are the natural result of bringing the specified components together under the conditions called for pursuant to this disclosure. Also, even though the claims hereinafter may refer to substances, components and/or ingredients in the present tense ("comprises", "is", etc.), the reference is to the substance, component or ingredient as it existed at the time just before it was first contacted, blended or mixed with one or more other substances, components and/or ingredients in accordance with the present disclosure. The fact that a substance, component or ingredient may have lost its original identity through a chemical reaction or transformation during the course of contacting, blending or mixing operations, if conducted in accordance with this disclosure and with ordinary skill of a chemist, is thus of no practical concern.

Except as may be expressly otherwise indicated, the article "a" or "an" if and as used herein is not intended to limit, and should not be construed as limiting, a claim to a single element to which the article refers. Rather, the article "a" or "an" if and as used herein is intended to cover one or more such elements, unless the text expressly indicates otherwise.

Unless otherwise specified herein, the invention may comprise, consist or consist essentially of the materials and/or procedures recited herein.

Each and every patent or publication referred to in any portion of this specification is incorporated in toto into this disclosure by reference, as if fully set forth herein.

This invention is susceptible to considerable variation in its practice. Therefore the foregoing description is not intended to limit, and should not be construed as limiting, the invention to the particular exemplifications presented hereinabove.

That which is claimed is:

1. A method of treating a subterranean formation, which method comprises injecting into the formation a viscosified mixture formed by irradiating with radio frequency electromagnetic radiation, a mixture of at least a hydratable polymer and an aqueous medium to form the viscosified mixture comprising aqueous medium and hydrated polymer.

2. A method as in claim 1 wherein the electromagnetic radiation is of a frequency in the range of about 500 KHz to about 1400 MHz.

3. A method as in claim 2 wherein the electromagnetic radiation is of a frequency in the range of about 1 to about 1000 MHz.

4. A method as in claim 2, wherein the electromagnetic radiation signal is in the range of about 30 to about 1000 watts.

5. A method as in any of claims 1-4 wherein the irradiation is conducted for a period of time in the range of about 5 to about 60 seconds.

6. In a method of hydraulic fracturing a subterranean well formation, the improvement comprising injecting into the formation a viscosified mixture formed by irradiating with radio frequency electromagnetic radiation, a mixture of at least a hydratable polymer and an aqueous medium to form the viscosified mixture comprising aqueous medium and hydrated polymer.

7. In a method of gravel packing a subterranean well formation, the improvement comprising injecting into the formation a viscosified mixture formed by irradiating with radio frequency electromagnetic radiation, a mixture of at least a hydratable polymer and an aqueous medium to form the viscosified mixture comprising aqueous medium and hydrated polymer.

8. A process of hydrotreating a subterranean formation, which method comprises:
continuously flowing through an irradiation zone of radio frequency electromagnetic radiation a mixture of at least a hydratable polymer and an aqueous medium to continuously convert the mixture into a viscosified mixture comprising the aqueous medium and hydrated polymer; and
injecting a fluid comprising the viscosified mixture into the subterranean formation.

9. A process as in claim 8 wherein the electromagnetic radiation is of a frequency in the range of about 500 KHz to about 1400 MHz with a signal of about 30 to about 1,000 watts, and wherein the mixture of at least the hydratable polymer and the aqueous medium has a rate of flow through the zone that provides an average residence time of the continuously flowing mixture in the zone within the range of about 5 to about 60 seconds.

10. A method as in any of claims 8-9, further comprising automatically controlling the radio frequency electromagnetic radiation in the irradiation zone using one or more feedback signals indicative of a periodically or continuously measured viscosity of the viscosified mixture.

11. A method as in claim 8 wherein the electromagnetic radiation is of a frequency in the range of about 500 KHz to about 1400 MHz.

12. A method as in claim 11 wherein the electromagnetic radiation is of a frequency in the range of about 1 to about 1000 MHz.

13. A method as in claim 11, wherein the electromagnetic radiation signal is in the range of about 30 to about 1000 watts.

14. A method as in claim 8, wherein the electromagnetic radiation signal is in the range of about 30 to about 1000 watts.

15. In a method of hydraulic fracturing a subterranean well formation, the improvement comprising continuously flowing through an irradiation zone of radio frequency electromagnetic radiation a mixture of at least a hydratable polymer and an aqueous medium to continuously convert the mixture into a viscosified mixture comprising the aqueous medium and hydrated polymer; and injecting a fluid comprising the viscosified mixture into the subterranean formation.

16. A process as in claim 15 wherein the electromagnetic radiation is of a frequency in the range of about 500 KHz to about 1400 MHz with a signal of about 30 to about 1,000 watts, and wherein the mixture of at least the hydratable polymer and the aqueous medium has a rate of flow through the zone that provides an average residence time of the continuously flowing mixture in the zone within the range of about 5 to about 60 seconds.

17. A method as in claim 15, further comprising automatically controlling the radio frequency electromagnetic radiation in the irradiation zone using one or more feedback signals indicative of a periodically or continuously measured viscosity of the viscosified mixture.

18. In a method of gravel packing a subterranean well formation, the improvement comprising continuously flowing through an irradiation zone of radio frequency electromagnetic radiation a mixture of at least a hydratable polymer and an aqueous medium to continuously convert the mixture into a viscosified mixture comprising the aqueous medium and hydrated polymer; and injecting a fluid comprising the viscosified mixture into the subterranean formation.

19. A process as in claim 18 wherein the electromagnetic radiation is of a frequency in the range of about 500 KHz to about 1400 MHz with a signal of about 30 to about 1,000 watts, and wherein the mixture of at least the hydratable polymer and the aqueous medium has a rate of flow through the zone that provides an average residence time of the continuously flowing mixture in the zone within the range of about 5 to about 60 seconds.

20. A method as in claim 18, further comprising automatically controlling the radio frequency electromagnetic radiation in the irradiation zone using one or more feedback signals indicative of a periodically or continuously measured viscosity of the viscosified mixture.

* * * * *